United States Patent [19]

Cassidy

[11] 4,183,388

[45] Jan. 15, 1980

[54] RUN-FLAT TIRE HAVING INTERNAL SUPPORT MEANS

[75] Inventor: Donald C. Cassidy, Bloomfield Hills, Mich.

[73] Assignee: General Motors Corporation, Detroit, Mich.

[21] Appl. No.: 927,505

[22] Filed: Jul. 24, 1978

[51] Int. Cl.² .................................................. B60C 17/04
[52] U.S. Cl. ........................................ 152/158; 152/339
[58] Field of Search ......... 152/158, 157, 155, 330 RF, 152/330 L, 331, 339, 340

[56] References Cited

U.S. PATENT DOCUMENTS

| 488,061 | 12/1892 | Bunker | 152/157 |
|---|---|---|---|
| 2,045,341 | 6/1936 | Bourdon | 152/340 |
| 3,435,872 | 1/1969 | Johnson | 152/158 |

FOREIGN PATENT DOCUMENTS

| 424744 | 5/1911 | France | 152/158 |
| 2005856 | 4/1969 | France | 152/158 |
| 679642 | 9/1952 | United Kingdom | 152/158 |

OTHER PUBLICATIONS

Abstract of British reference 145,312.

Primary Examiner—Joseph F. Peters, Jr.
Assistant Examiner—D. W. Underwood
Attorney, Agent, or Firm—John P. Moran

[57] ABSTRACT

The drawings illustrate a pneumatic tubeless tire including internal support means. The internal support means comprises a three component system including an inner circumferentially oriented preloaded portion abutted against the wheel rim and normally supporting an outer portion consisting of an endless resilient ring, and an intermediate circumferentially split resilient ring. The latter ring is formed to include side surfaces which match the inner surfaces of the beaded ends for seating thereon when the tire becomes deflated, at which time the inner preloaded portion compresses.

3 Claims, 4 Drawing Figures

RUN-FLAT TIRE HAVING INTERNAL SUPPORT MEANS

This invention relates generally to pneumatic tires and, more particularly, to pneumatic tires having internal "run-flat" features.

Heretofore, various structures have been suggested for use inside a pneumatic tire to support the weight of the vehicle in the event of a deflated tire.

The object of this invention is to provide improved internal means for use in pneumatic tires for rotatably supporting a vehicle in the event of a "flat-tire" condition.

Another object of the invention is to provide, for use with a wheel rim and a pneumatic tubeless tire, a tire stabilizer including ring means mounted within the tire and supported on either circumferentially spaced ball-like elements or an inner tube mounted on the wheel rim in the space between the beaded ends and adapted to compress during tire run-flat conditions to permit the ring means to ride on the inner surfaces of the beaded ends to thereafter retain the beaded ends in place and to support the weight of the vehicle.

A further object of the invention is to provide, for use with a wheel rim, a pneumatic tubeless tire including the usual outer tread portion, oppositely disposed sidewalls, and a bead adjacent each inner sidewall end, and, in cooperation therewith, internal support means for supporting the tire outer tread should the tire become deflated, such internal support means including an endless resilient ring, a transversely split ring mounted within the endless ring and having side surfaces formed to match the inner surfaces of the beaded ends, and support means intermediate the split ring and the wheel rim for retaining the two rings away from the rim and centered within the tire during normal operation and adapted to compress to permit the side surfaces of the split ring to engage the beaded end portions and support the vehicle when the tire becomes deflated.

These and other objects and advantages will become more apparent when reference is made to the following description and accompanying drawings, wherein.

Figure 1:
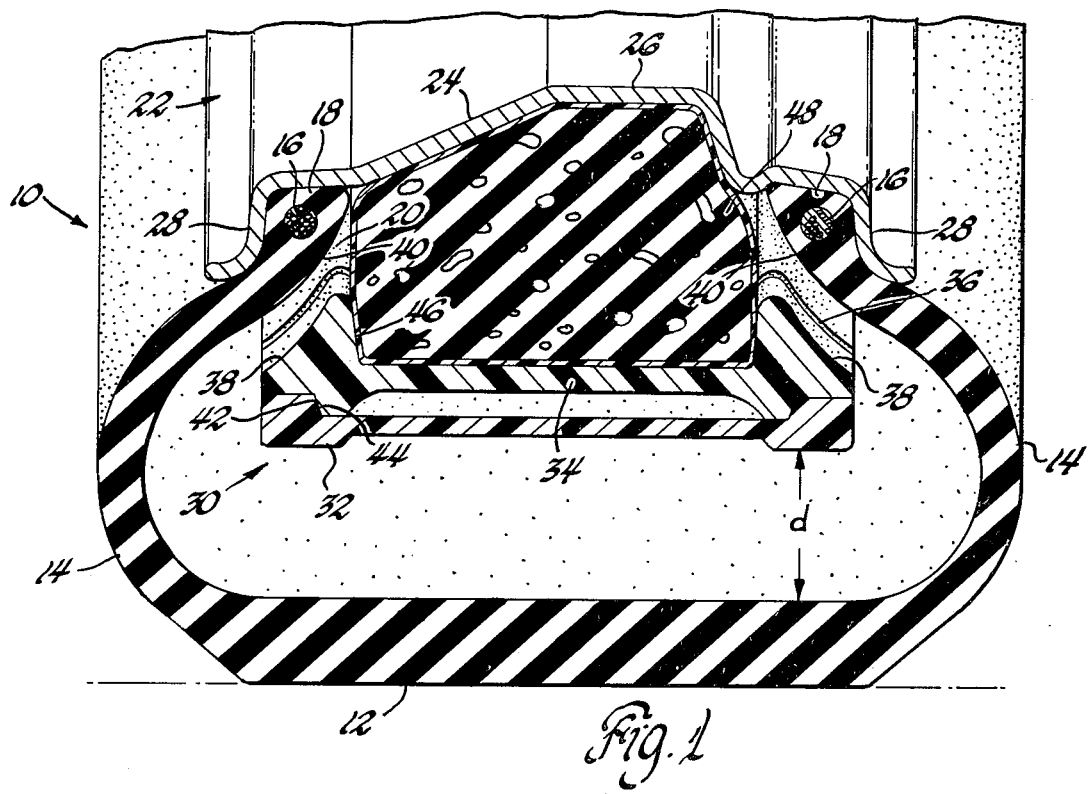
FIG. 1 is a cross-sectional view of a wheel rim and pneumatic tire arrangement embodying the invention.

Referring now to the drawings in greater detail, FIG. 1 illustrates a pneumatic tubeless tire 10 including an outer tread portion 12, oppositely disposed sidewalls 14, a bead 16 adjacent each inner sidewall end portion 18, and an annular opening 20 between the beaded ends, for mounting on a vehicle wheel 22 having a rim 24 including a drop center 26 and rim flanges 28 formed on oppositely disposed sides thereof for retaining the beaded ends 16/18 in sealing engagement therewith when the tire is inflated.

A tire stabilizer 30 is mounted circumferentially around the rim 24 of the wheel 22, within the tire 10. The tire stabilizer 30 includes an endless outer resilient polymeric ring 32 mounted within the tire 10 and spaced apart from the oppositely disposed sidewalls 14. An inner resilient ring 34 of a suitable polymer having a transverse split 36 formed at some one circumferential point therearound and mounted within the outer ring 32. The rings 32 and 34 may be made of a heat resistant, smooth material such as nylon or polyester, and may be fiber reinforced. The side surfaces 38 of the inner ring 34 are formed to match the usual inner surfaces 40 of the beaded ends 16/18 of the tire 10 for a purpose to be described.

An annular collar 42 is formed on the outer surface of the inner split ring 34, and an annular recess 44 is formed on the inner surface of the outer endless ring 32 such that they intermesh as shown in FIG. 1 to form interlocking means for all operational conditions. An additional annular recess 46 is formed around the inner surface of the inner ring 34.

Each of a plurality of circumferentially spaced balls 48 or other ball-like elements is mounted in a preloaded condition between the wheel rim 24 and the annular recess 46 of the inner split ring 34 for retaining the interlocked rings 32 and 34 at a predetermined location intermediate the rim 24 and the inner surface of the outer tread portion 12, providing a normal running clearance of a predetermined distance d between the outer surface of the outer ring 32 and the inner surface of the bottom or ground-contacting portion of the outer tread portion 12. Such ball-like elements 48 may be foam puff-type balls or hollow or inflated balls of suitable smooth resilient material.

Figure 2:
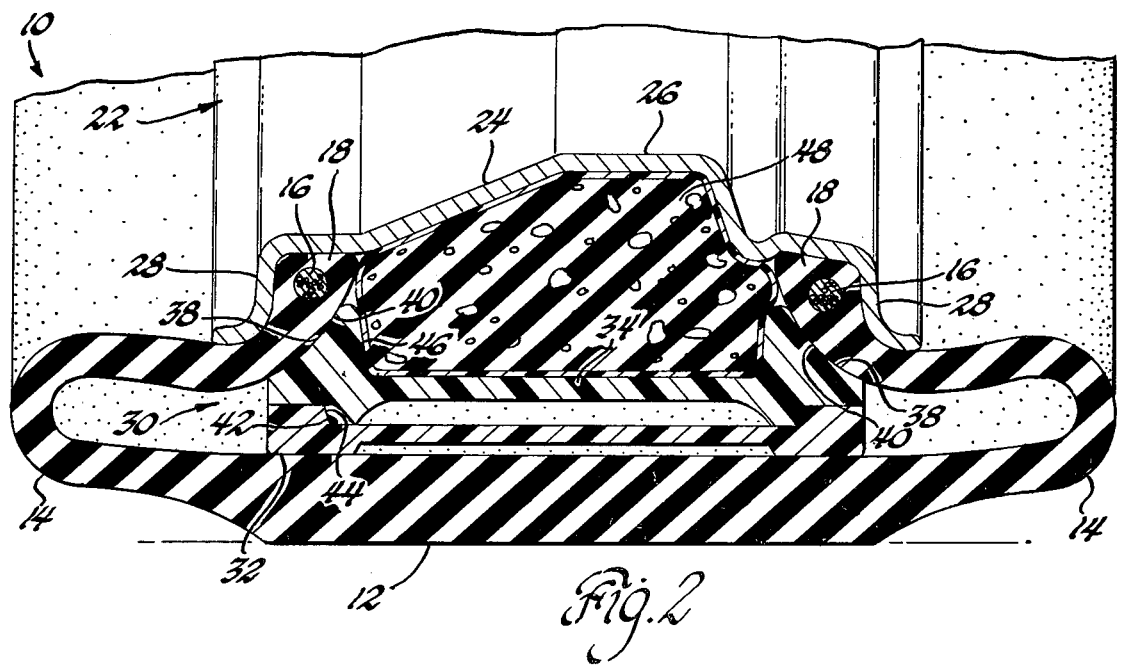
FIG. 2 is a cross-sectional view of a wheel rim and pneumatic tire arrangement similar to FIG. 1, but showing the tire in a deflated condition.

As shown in FIG. 2, when the tire 10 becomes deflated, the inner surface of the outer tread portion 12 adjacent the road surface contacts the outer ring 32 and forces the contacted portion of said ring and the inner ring 34 radially inwardly, compressing the balls 48 in turn, such that the side surfaces 38 of the inner ring 34 seat on and roll around on the side surfaces 40 of the beaded ends 16/18, and thereby retain the latter in sealing engagement with the rim flanges 28, while the outer ring 32 supports the outer tread portion 12 and the weight of the vehicle.

To facilitate assembly of the tire stabilizer 30 within the tire 10, the inside diameter of the inner ring 34 is at least as great as the outside diameter of the wheel flanges 28. To provide for self-aligning and bead retention characteristics of the inner ring 34 on the inner surfaces 40 of the beaded ends 16/18, the width of the rings 32 and 34 is in the range of the rim width to one inch less than the rim width. The width of the recess 46 is preferably from one and a half to two inches less than the width of the wheel rim to assure that the balls 48 center the rings 32 and 34 within the tire 10 during normal inflated operation, and for proper radial alignment with the beaded end surfaces 40 during deflated operation.

At assembly, the tire 10 is mounted on one side of the wheel 22 in the usual manner. The outer resilient ring 32 is first squeezed into an elliptic shape and inserted from the open tire side, after which the split ring 34 is fed into position inside the outer ring 32 such that the collar 42 is fitted within the recess 44. The support balls 48 are next inserted at predetermined circumferential locations and in a preloaded condition between the rim 24 and the annular recess 46, after which the other side of the tire is mounted as usual.

Figure 3:
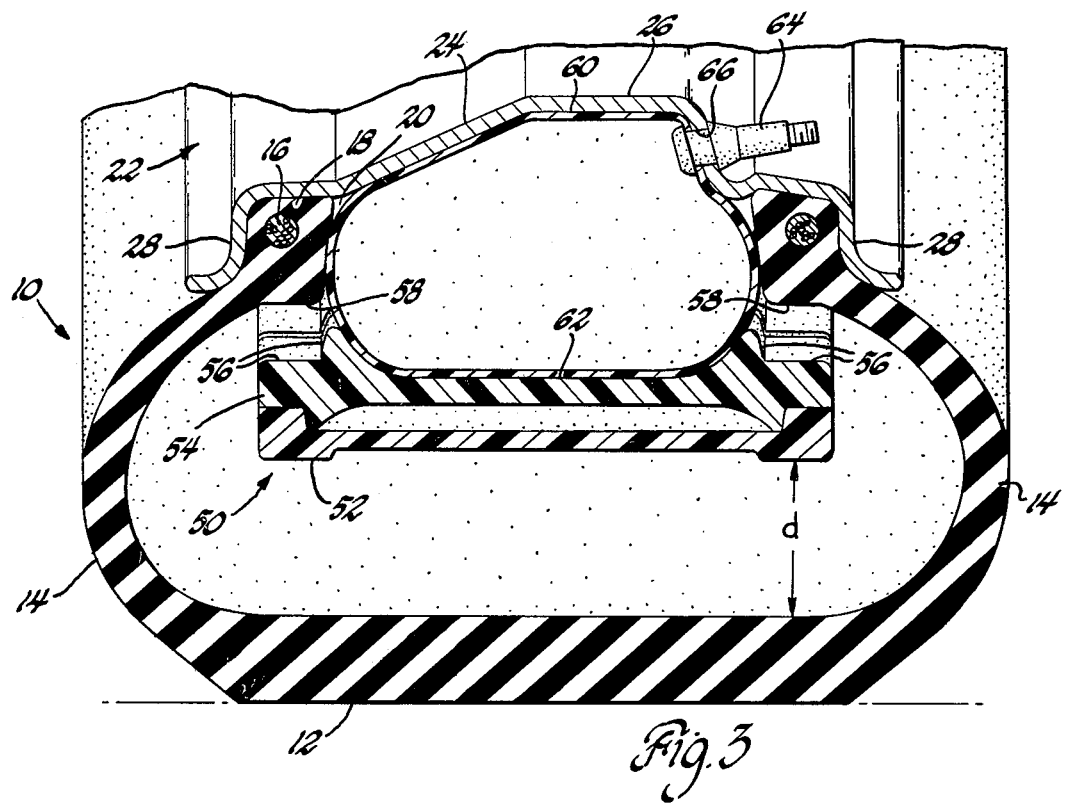
FIG. 3 is a cross-sectional view of a wheel rim and pneumatic tire arrangement showing an alternate embodiment of the invention.
Figure 4:
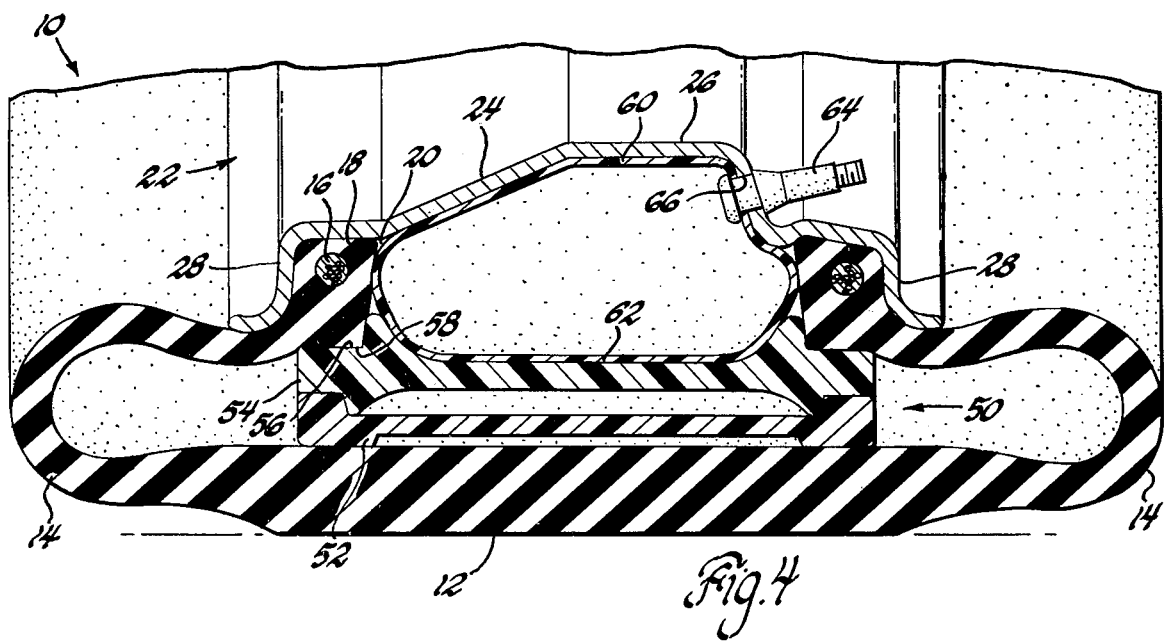
FIG. 4 is a cross-sectional view of a wheel rim and pneumatic tire arrangement similar to FIG. 3, but showing the tire in a deflated condition.

In the alternate embodiment shown in FIGS. 3 and 4, a tire stabilizer 50 includes an endless outer ring 52 identical to the ring 32 of FIGS. 1 and 2, and an inner split ring 54 similar to the split ring 34 of FIGS. 1 and 2, except that the side surfaces 56 thereof are formed to include a stepped configuration which matches a modified sharper-cornered inner surface 58 of the beaded end 16/18 of the tire 10. An inflatable inner tube 60 is mounted between the wheel rim 24 and an annular recessed inner surface 62 formed on the inner ring 54, in lieu of the above described preloaded balls 48. A valve 64 extends through an aperture 66 formed in the rim 24 for inflating the tube 60. The operation of the stabilizer 50 arrangement is comparable to that of the stabilizer 30 arranged during both normal operating and deflated tire conditions.

It should be understood that a modified beaded end 16/18 and cooperating inner ring could be used with the ball type support means 48, and that the inner tube 60 could be used with an inner ring shaped as in the FIGS. 1 and 2 arrangement.

Assembly of the tire 10 and the stabilizer 50 on the wheel 22 is similar to that of the tire and stabilizer 30, as explained above, except that the tube 60 may be mounted in a deflated condition prior to the initial mounting of the tire 10 on one side of the wheel 22, and may be inflated either before or after the tire is inflated.

While but two general embodiments of the invention have been shown and described, other embodiments thereof are possible.

The embodiments of the invention in which an exclusive property or privilege is claimed are defined as follows:

1. In combination, a pneumatic tire having an outer annular tread portion and a pair of oppositely disposed sidewalls extending inwardly from said tread portion, each of said sidewalls terminating in an annular bead disposed radially inwardly from said tread portion, said beads being laterally spaced from one another to define an annular opening leading to the interior of said tire, an annular rim for said tire having a pair of laterally spaced and outwardly extending flanges formed on oppositely disposed sides thereof for sealingly receiving said beads of said tire when said tire is inflated, a tire stabilizer assembly comprising an endless outer ring mounted within said tire intermediate and spaced apart from said sidewalls and further comprising an inner ring having annular side surfaces formed to match the corresponding inner surfaces of said beads, said rings being of resilient polymeric material and having cooperating interlock means for securing said rings to one another, and circumferentially oriented and preloaded support means confined between said inner ring and said rim and operatively disposed in said annular opening of said tire for retaining said inner and outer rings at a predetermined radial location intermediate said rim of said outer tread portion during normal operation of said tire, said preloaded support means being adapted to be compressed by said annular tread portion to permit said side surfaces of said inner ring to be forced against said beads to thereby retain said beads in sealing engagement with said flanges while said outer ring directly contacts and supports said outer tread portion in response to deflation of said tire.

2. In combination, a pneumatic tire having an outer annular tread portion and a pair of oppositely disposed sidewalls extending inwardly from said tread portion, each of said sidewalls terminating in an annular bead concentric with said tread portion, said beads being laterally spaced from one another to define an annular opening to the interior of said tire, an annular rim for said tire having a pair of laterally spaced and outwardly extending flanges formed on oppositely disposed sides thereof for sealingly receiving said beads of said tire when said tire is inflated, a tire stabilizer assembly comprising an endless outer ring mounted within said tire intermediate and spaced apart from said sidewalls and further comprising an inner ring having a pair of annular side surfaces formed to match the corresponding inner surfaces of said beads, said rings being of resilient polymeric material having cooperating interlock means for securing said rings to one another, and circumferentially oriented preloaded balls arcuately spaced from one another and confined between said inner ring and said rim and operatively disposed in said annular opening of said tire for retaining said inner and outer rings at a predetermined radial location intermediate said rim of said outer tread portion during normal operation of said tire, said preloaded balls being adapted to be compressed by said annular tread portion in response to the escape of air from said tire to permit said side surfaces of said inner ring to engage said beads to thereby retain said beads in sealing engagement with said flanges while said outer ring cooperates with said inner ring to directly contact and supports said outer tread portion in response to deflation of said tire.

3. In combination, a pneumatic tire having an outer annular tread portion and a pair of oppositely disposed sidewalls extending inwardly from said tread portion, each of said sidewalls terminating in an annular bead disposed radially inwardly from said tread portion, said beads being laterally spaced from one another to define an annular opening to the interior of said tire, an annular rim for said tire having a pair of laterally spaced and outwardly extending flanges formed on oppositely disposed sides thereof for sealingly receiving said beads of said tire when said tire is inflated, a tire stabilizer assembly comprising an endless outer ring mounted within said tire intermediate and spaced apart from said sidewalls and further comprising an inner ring having annular side surfaces formed to match the corresponding inner surfaces of said beads, said rings being of resilient polymeric material having cooperating interlock means for securing said rings to one another, and a preloaded annular inflatable tube confined between said inner ring and said rim in said annular opening for retaining said inner and outer rings away from said rim during normal operation of said tire and adapted to compress to permit said side surfaces of said inner ring to engage said beaded ends at the bottom portion of said tire, thereby retain said beaded ends in sealing engagement with said outer rim flanges while said outer ring supports said outer tread portion when said tire becomes deflated.

* * * * *